US007760243B2

(12) United States Patent
Moriyama et al.

(10) Patent No.: US 7,760,243 B2
(45) Date of Patent: Jul. 20, 2010

(54) IMAGING APPARATUS AND METHOD OF PROCESSING IMAGE SIGNAL

(75) Inventors: Shinichi Moriyama, Kanagawa (JP); Masaharu Tomura, Kanagawa (JP)

(73) Assignee: Sony Corporation, Tokyo (JP)

( * ) Notice: Subject to any disclaimer, the term of this patent is extended or adjusted under 35 U.S.C. 154(b) by 334 days.

(21) Appl. No.: 11/787,799

(22) Filed: Apr. 18, 2007
(Under 37 CFR 1.47)

(65) Prior Publication Data
US 2008/0007629 A1 Jan. 10, 2008

(30) Foreign Application Priority Data
Apr. 20, 2006 (JP) .............................. 2006-117020

(51) Int. Cl.
*H04N 5/228* (2006.01)
(52) U.S. Cl. .................................. 348/222.1
(58) Field of Classification Search ............... 348/222.1
See application file for complete search history.

(56) References Cited

U.S. PATENT DOCUMENTS

| 5,229,853 | A * | 7/1993 | Myers ........................ 348/458 |
| 7,286,167 | B2 * | 10/2007 | Sakamoto et al. ........ 348/231.6 |
| 2002/0130960 | A1 | 9/2002 | Fujimoto |
| 2003/0222998 | A1 * | 12/2003 | Yamauchi et al. ........... 348/262 |
| 2004/0041928 | A1 | 3/2004 | Hirakoso et al. |
| 2004/0085461 | A1 * | 5/2004 | Sakamoto et al. ........ 348/231.3 |
| 2004/0263637 | A1 * | 12/2004 | Serizawa et al. ......... 348/222.1 |
| 2006/0017597 | A1 * | 1/2006 | Jaspers ....................... 341/155 |

FOREIGN PATENT DOCUMENTS

| EP | 0 810 778 | 12/1997 |
| JP | 2-67650 | 3/1990 |
| JP | 4-319871 | 11/1992 |
| JP | 9 35053 | 2/1997 |
| JP | 10 285541 | 10/1998 |
| JP | 2884384 | 2/1999 |
| JP | 2001 128191 | 5/2001 |
| JP | 2003 108986 | 4/2003 |
| JP | 2003 134530 | 5/2003 |
| WO | WO 2006 031690 | 3/2006 |

OTHER PUBLICATIONS

Japan electronics and IT industries association, Apr. 2002, JEITA CP-3451 EXIF 2.2.*

* cited by examiner

*Primary Examiner*—James M Hannett
(74) *Attorney, Agent, or Firm*—Frommer Lawrence & Haug LLP; William S. Frommer; Thomas F. Presson

(57) ABSTRACT

An imaging apparatus comprising an imaging unit that images a subject and produces an image signal, a signal-processing unit that performs dynamic range compression processing on the image signal, and a first output unit that produces a first output signal based on the image signal processed in the signal-processing unit. The imaging apparatus also has a signal-producing unit that produces a signal including the image signal and any processing information that indicates which dynamic range compression processing is performed in the signal-processing unit, and a second output unit that produces a second output signal based on the signal produced in the signal-producing unit.

9 Claims, 13 Drawing Sheets

IMAGING APPARATUS AND METHOD OF PROCESSING IMAGE SIGNAL

CROSS REFERENCE TO RELATED APPLICATION

The present invention contains subject matter related to Japanese Patent Application JP 2006-117020 filed in the Japanese Patent Office on Apr. 20, 2006, the entire contents of which being incorporated herein by reference.

BACKGROUND OF THE INVENTION

1. Field of the Invention

The present invention relates to an imaging apparatus and a method of processing an image signal.

2. Description of Related Art

FIG. 1 shows a configuration of a past imaging apparatus 10. The imaging apparatus 10 has an imaging unit 20, a signal-processing unit 30, and an output unit 40.

An image pickup device 21 in the imaging unit 20 is driven by a driving portion 22 and produces an analog image signal SVa based on an image of a subject to supply an analog-signal-processing portion 23 with the produced image signal SVa. The analog-signal-processing portion 23 performs various kinds of signal processing such as noise reduction on the image signal SVa to produce a processed image signal SVb and supplies an A/D converter 24 with the processed image signal SVb. The A/D converter 24 receives the image signal SVb and converts it to a digital image signal DVa. A color-control-processing portion 31 in the signal-processing unit 30 receives the digital image signal DVa and performs any processing such as improvement of color reproductivity on the digital image signal DVa to produce a color-controlled image signal DVb. A nonlinear-processing portion 32 receives the color-controlled image signal DVb and performs any processing such as dynamic range compression processing and gamma processing on the image signal DVb to produce a non-linear-processed image signal DVc. A detail-processing portion 33 receives the non-linear-processed image signal DVc and performs any processing such as contour compensation on the image signal DVc to produce an image signal DVd. The output unit 40 receives the image signal DVd from the signal-processing unit 30 and converts it to a signal having a transmission format corresponding to image-displaying device and/or image-recording device to produce an output signal DVout.

FIG. 2 shows a relationship between intensity of light input to the image pickup device 21 and the imaged signal SVa output from the image pickup device 21. The image pickup device 21 used in the image pickup unit 20, which has a dynamic range of 600% or more, has been put to practical use. For example, at the intensity of input light of 0%, the image signal SVa has a signal level of LE (0%) and at the intensity of light of 600%, the image signal SVa has a signal level of LE (600%). The A/D converter 24 is thus designed for maintaining a dynamic range of 600% or more corresponding to the image pickup device 21. The dynamic range compression processing is then performed so that the image signal can have a signal level corresponding to any broadband standards.

FIG. 3 shows Knee compensation processing by which an image portion having intensity of input from 80% to 600% is compressed to an image portion having output level from 80% to 109% (white clip level). In the imaging apparatus 10, any gamma compensation is performed so that an image signal can correspond to input/output properties of display device used in the image-displaying device, not shown. For example, if a cathode ray tube is used as the image-displaying device, nonlinear processing such that its input/output property can become convex upwardly, namely, be over compensated on a region of the intensity of input of 80% or less. On a dark image region, for example, a region GA shown in FIG. 3 in which the intensity of input stays within a range from 0% to 20%, black gamma compensation is formed so that a hue in the dark image region can be richly represented or gradation in the dark image region can be finely represented. Such the Knee compensation or the gamma compensation exerts a great influence on its picture quality subjectively, thereby enabling them to be controlled according to user's desire.

Japanese Patents Nos. 2884384 and 2067650 and Japanese Patent Application Publication No. H04-319871 have respectively disclosed that the nonlinear processing such as the Knee compensation or the gamma compensation can provide an image having any subjective fine picture quality.

SUMMARY OF THE INVENTION

In the post-production processing performed after shooting an image, a computer or the like has enabled various kinds of processing to be simply performed at high speed, accompanying with any improvement of its performance. FIG. 4 illustrates a procedure for such the image processing. At Step ST1, by using an image pickup apparatus, an image of subject is shot to produce an image signal. A recording medium stores the image signal thus produced. At Step ST2, the image signal is captured. During the capture of the image signal, the stored image signal is read from the recording medium and reproduced. A post-production processing apparatus, which is not shown, writes the reproduced image signal in its memory, its hard disk or the like. At Steps ST3 through ST6, any edition processing such as cut edition, exposure compensation and/or tone correction, color tuning, and special effects is performed on the image signal when necessary. When the edition processing has been performed, the edited image signal is recorded, at Step ST7, on a recording medium or stored in a server or the like.

In such the edition processing, an editor has often demanded increase in exposure compensation and an alteration of gamma curve, and the like. The signal output from the past imaging apparatus 10 has a small amount of information because of dynamic range compression processing on which the signal is performed therein. If, thus, performing any post-production processing on the signal output from the past imaging apparatus 10 when an editor demands increase in exposure compensation and an alteration of gamma curve, a picture quality of an image after the post-production processing may be reduced. For example, if performing the post-production processing of increase in color tone on an image having a region to which Knee compensation has been performed, an image having a reduced color tone quality thereof appears after the post-production processing because an image having a region to which the Knee compensation has been performed has a small amount of information.

In a film camera used in a motion-movie studio or the like, an image shot at an adequate amount of exposure is equal to an image having a dynamic range of about 600% so that an imaging apparatus using image pickup device may be required for having any performance equal to that of the film camera. This enables to be realized an image shot by the image pickup apparatus without performing the Knee compensation, the gamma compensation and the like. In this case, if post-production processing that has any performance equal to that of the film camera is performed, it is possible to provide an image having an excellent picture quality because no Knee compensation or no gamma compensation is performed on this image. When, however, an image is displayed by using a signal on which no Knee compensation or no gamma compensation is performed, it is difficult for the image displayed on the image-displaying device to represent brightness or color tone when the Knee compensation or the gamma compensation is performed. It is also difficult to check in real time brightness and color tone in an image during shooting thereof on a display of the image-displaying device like when an image pickup apparatus in which the Knee compensation or the gamma compensation is performed on an image is used.

It is thus desirable to provide an imaging apparatus, a method of processing an image signal and a program product by which a shot image can be easily checked and any reduced picture quality of the image after the post-production processing is performed thereon is considerably limited.

According to an embodiment of the present invention, there is provided an imaging apparatus containing an imaging unit that images a subject and produces an image signal, a signal-processing unit that performs dynamic range compression processing on the image signal, a first output unit that produces a first output signal based on the image signal processed in the signal-processing unit, a signal-producing unit that produces a signal including the image signal and any processing information that indicates which dynamic range compression processing is performed in the signal-processing unit, and a second output unit that produces a second output signal based on the signal produced in the signal-producing unit.

According to another embodiment of the present invention, there is provided a method of processing an image signal. The method includes a imaging step of imaging a subject and producing an image signal, a signal-processing step of performing dynamic range compression processing on the image signal, a first output step of producing a first output signal based on the image signal processed in the signal-processing step, a signal-producing step of producing a signal including the image signal and processing information that indicates which dynamic range compression processing is performed in the signal-processing step, and a second output step of producing a second output signal based on the signal produced in the signal-producing step.

According to further embodiment of the present invention, there is provided a program product of processing an image signal, which allows a computer to perform the above method of processing an image signal.

In the above embodiments of the invention, according to the dynamic range compression processing, the Knee compensation is performed on the image signal produced by shooting the subject to compress a signal level of a high brightness portion of the subject. As the processing information that indicates which dynamic range compression processing is performed, various kinds of pieces of processing information such as Knee point and Knee slope are used. When the Knee compensation is performed using a compensation table, information that indicates which compensation table is used is utilized as the processing information. When performing any other signal processing, information that indicates which signal processing is performed in the other signal processing is utilized as the processing information. For example, when the gamma compensation, color tuning aiming at improvement in color reproductivity, and detail processing aiming at improvement in discerner are performed, any information such that which broken line approximation or which compensation table is used in the gamma compensation, which gain adjustment or which masking coefficient is used in the color tuning, or which filter setting is used in contour compensation is utilized as the processing information.

In the production of the second output signal, the processing information is not only added but also an amount of data in the second output signal is reduced. The amount of data in the second output signal is reduced by, for example, making bit width of the image signal narrow or extracting an image signal so that information of a region which includes a small amount of information can be supplemented by the first output signal. The amount of data in the second output signal can be also reduced by coding the image signal. Weighting the image signal on reduction of the amount of the data allows the amount of the data to be adjusted so that amount of data can be reduced on the important potion of the image.

According to the above embodiments of the invention, dynamic range compression processing is performed on the image signal produced by shooting a subject and a first output signal is then produced based on the image signal processed by the dynamic range compression processing. The processing information that indicates which dynamic range compression processing is performed is added to the produced image signal and the second output signal is then produced based on the image signal adding such the processing information.

Using such the second output signal enables an image having an excellent picture quality to be obtained even if the post-production processing such that an editor demands increase in exposure compensation and an alteration of gamma curve is performed.

Using the second output signal also enables times of non-linear processing to be limited so that an image having an excellent picture quality can be produced. Further, using the first output signal enables check of the image of the subject on shooting the subject to be easily performed and an image to be easily designed before the post-production processing. Since the second output signal includes the processing information, it is possible to obtain an image of the subject, even when using the second output signal, that a user desires on shooting the subject when the processing information is used in the post-production processing.

The concluding portion of this specification particularly points out and directly claims the subject matter of the present invention. However, those skilled in the art will best understand both the organization and method of operation of the invention, together with further advantages and objects thereof, by reading the remaining portions of the specification in view of the accompanying drawing(s) wherein like reference characters refer to like elements.

DESCRIPTION OF THE PREFERRED EMBODIMENTS

The following will describe embodiments of the present invention with reference to the accompanied drawings. According to the embodiments of the invention, it is not only possible to check and record an image of a subject in imaging the subject using any existing image-displaying device and any existing image-recording device but also to output an image signal having a wider dynamic range than that of the past image signal. For example, it is possible to provide an image having an excellent picture quality after the post-production processing is performed thereon. Further, it is possible to provide an image of the subject that a user desires in imaging the subject by determining which signal processing is performed even if an image signal having a wider dynamic range is used.

Figure 1:
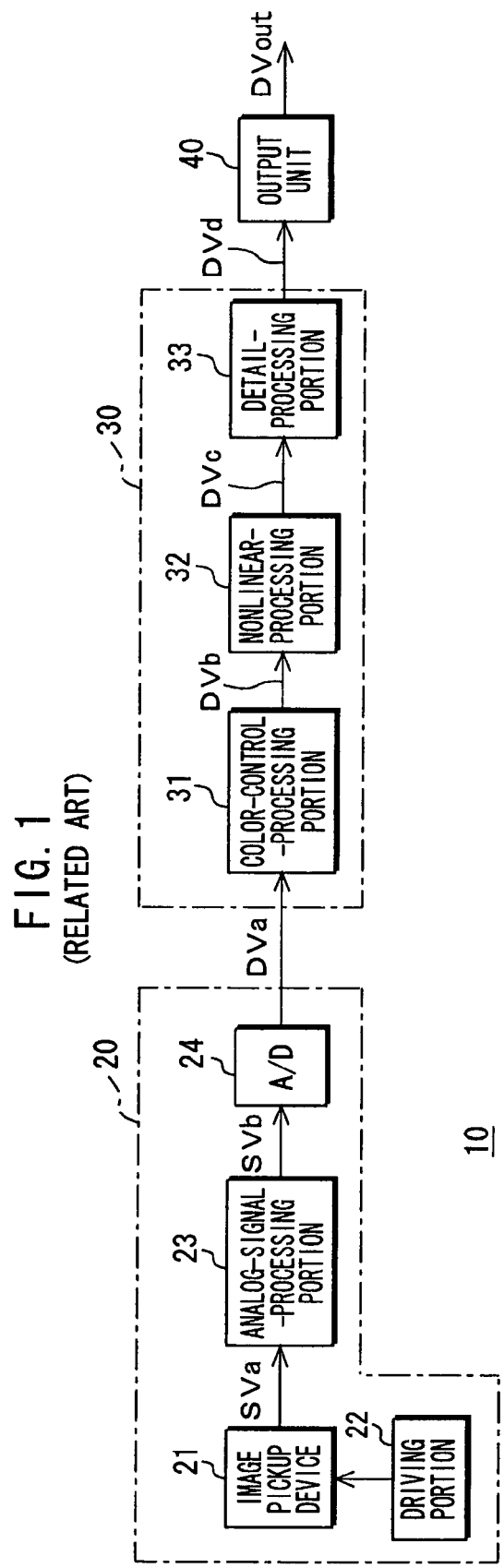
FIG. 1 is a functional block diagram for illustrating a configuration of an imaging apparatus as related art.
Figure 2:
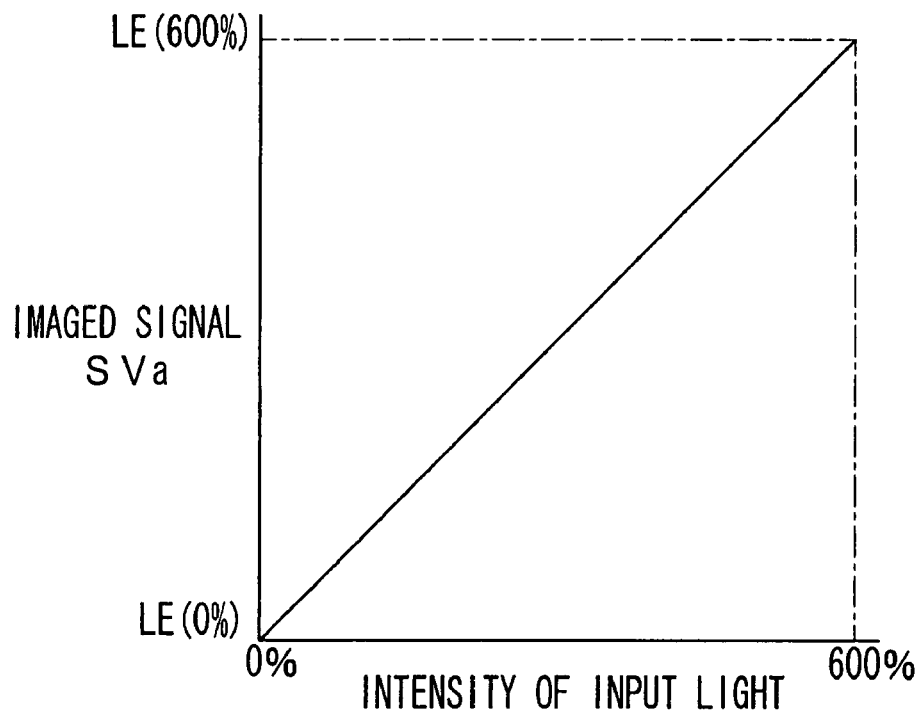
FIG. 2 is a graph for showing a relationship between intensity of input light and an image signal SVa.
Figure 3:
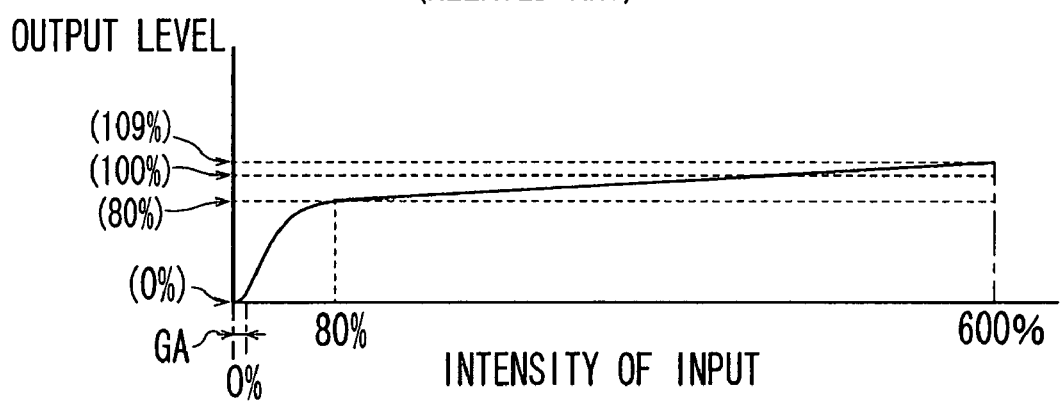
FIG. 3 is a graph for illustrating Knee compensation.
Figure 4:
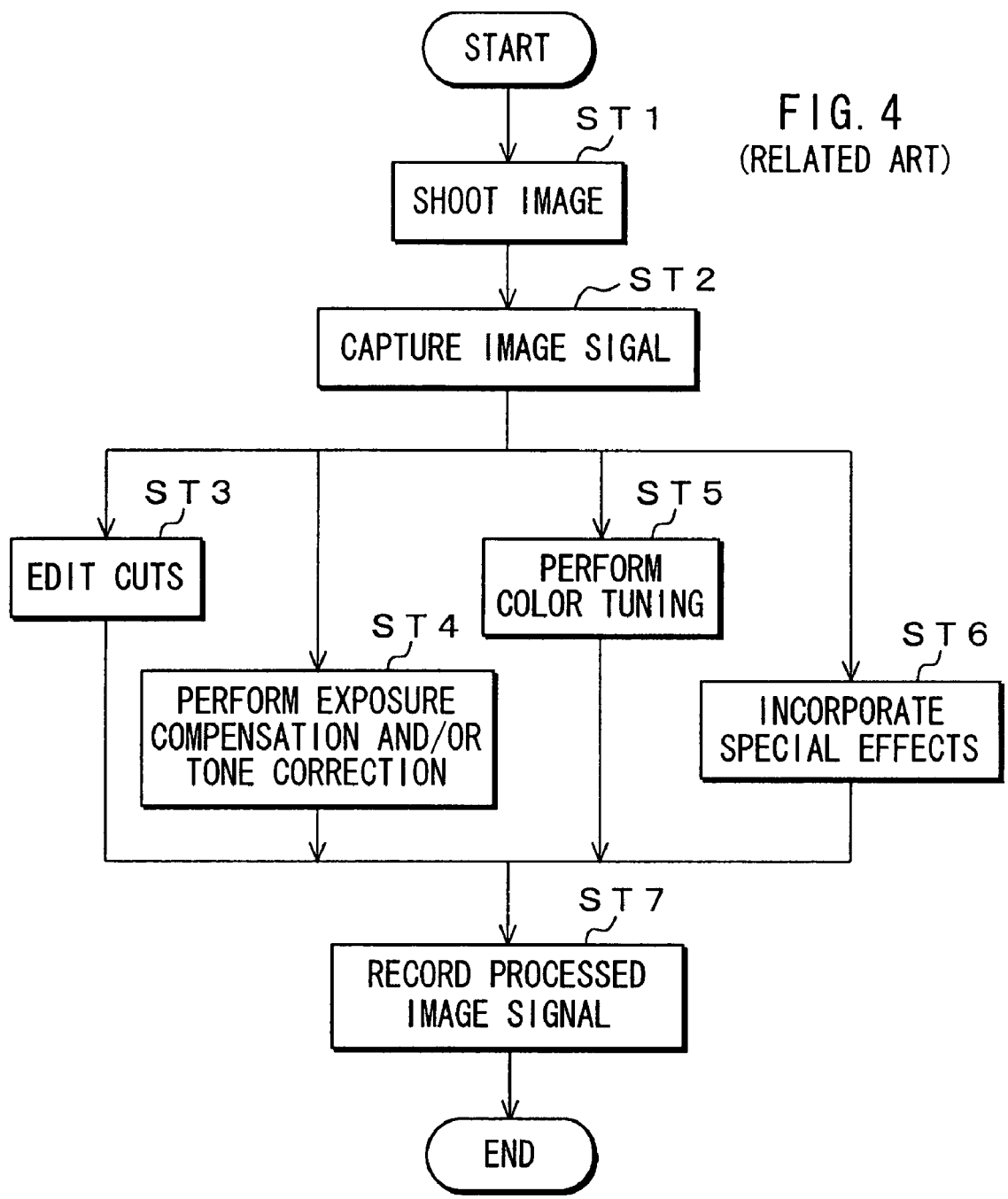
FIG. 4 is a flowchart for illustrating a procedure for the image processing.
Figure 5:
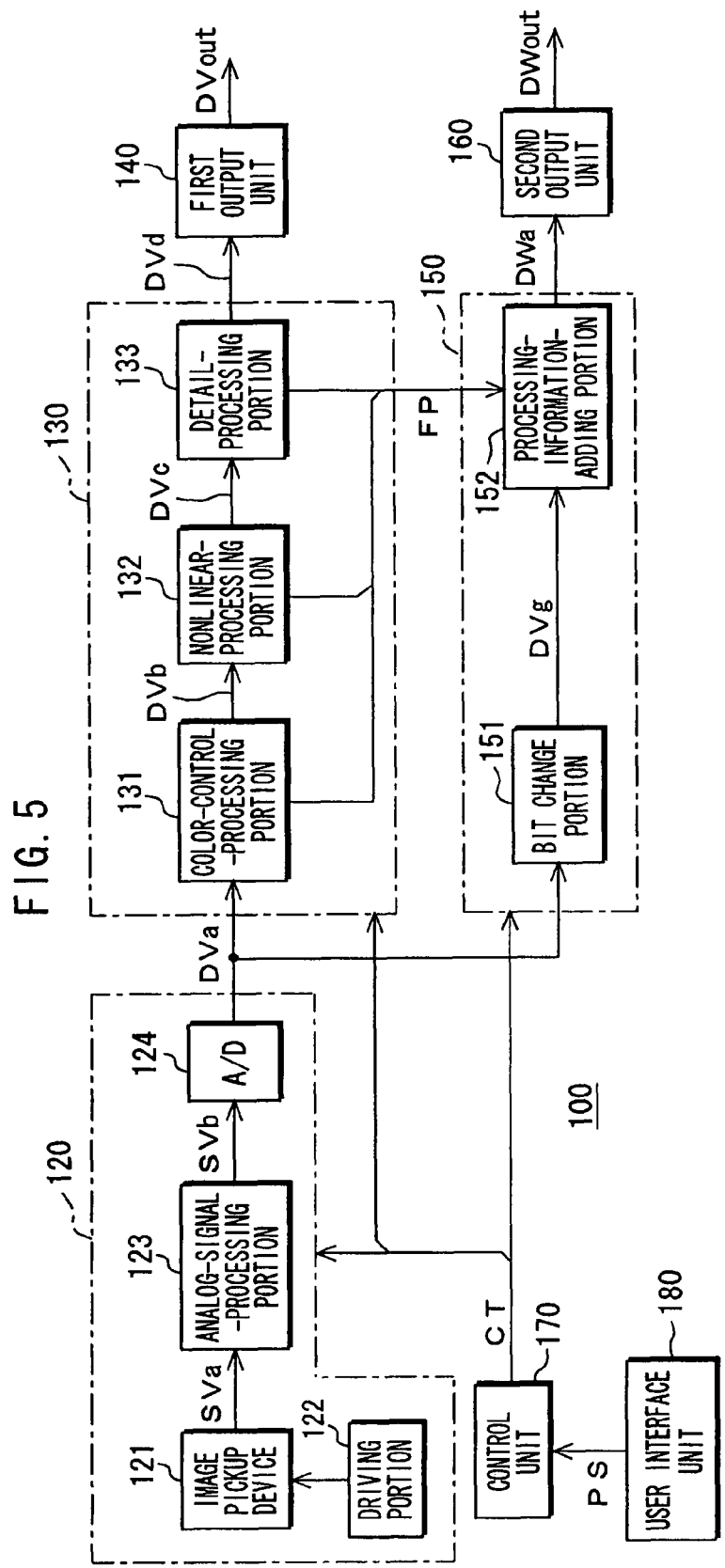
FIG. 5 is a functional block diagram for illustrating a configuration of an imaging apparatus according to a first embodiment of the invention.

FIG. 5 shows a configuration of an imaging apparatus 100 according to a first embodiment of the invention. The imaging apparatus 100 has an imaging unit 120, a signal-processing unit 130, a first output unit 140, a signal-producing unit 150, a second output unit 160, a control unit 170, and a user interface unit 180.

An image pickup device 121 in the imaging unit 120 is made of complementary metal oxide semiconductor (CMOS) element or charge coupled devices (CCD) element. The image pickup device 121 is driven by a driving portion 122 and produces an analog image signal SVa, for example, an analog signal on the three primary colors, based on an image of a subject to supply an analog-signal-processing portion 123 with the produced image signal SVa.

The analog-signal-processing portion 123 performs on the image signal SVa various kinds of signal processing such as noise reduction on the image signal SVa, an amplification of the noise-reduced signal, and setting of black level to the amplified signal. The analog-signal-processing portion 123 performs the signal processing on the image signal SVa to produce an image signal SVb and supplies an A/D converter 124 with the processed image signal SVb.

The A/D converter 124 receives the image signal SVb and converts it to a digital image signal DVa. The A/D converter 124 supplies the signal-processing unit 130 and the signal-producing unit 150 with the digital image signal DVa.

A color-control-processing portion 131 in the signal-processing unit 130 receives the digital image signal DVa and performs on the digital image signal DVa any processing such as white balance adjustment, hue adjustment, and linear matrix processing to reproduce color adequately or so that a user desires it. The color-control-processing portion 131 performs such the color reproductivity on the digital image signal DVa to produce a color-controlled image signal DVb and supplies a nonlinear-processing portion 132 with the image signal DVb. The nonlinear-processing portion 132 receives the image signal DVb and performs any processing such as dynamic range compression processing and gamma compensation for constant representation on the image signal DVb to produce a non-linear-processed image signal DVc. The non-linear-processing portion 132 supplies a detail-processing portion 133 with the image signal DVc.

The detail-processing portion 133 receives the image signal DVc and performs any processing such as contour compensation on the image signal DVc to produce an image signal DVd. The detail-processing portion 133 supplies the first output unit 140 with the image signal DVd. The first signal-processing unit 130 supplies the signal-producing unit 150 with processing information FP that indicates which signal processing is performed in the signal-processing unit 130.

The first output unit 140 receives the image signal DVd from the signal-processing unit 130 and converts it to a signal having a transmission format corresponding to image-displaying device and/or an image-recording device to produce a first output signal DVout. If a brightness signal or a color difference signal is used as the first output signal DVout, the first output unit 140 performs matrix operation thereon.

The signal-producing unit 150 adds the processing information FP that indicates which signal processing is performed in the signal-processing unit 130 to the image signal DVa received from the imaging unit 120 to produce a signal DWa and supply the second output unit 160 with it. If the second output unit 160 outputs the signal DWA including the processing information FP when a transmission path has not a sufficient transmission rate, it is difficult to transmit the image signal DVa for each frame. Such the transmission path, however, has a sufficient transmission rate is expensive. In this embodiment, in order to prevent the configuration of the imaging apparatus from being increased in costs, the signal-producing unit 150 performs any decreasing processing in an amount of data on the image signal DVa.

A bit change portion 151 in the signal-producing unit 150 performs such the decreasing processing in an amount of data on the image signal DVa. The bit change portion 151 narrows width in bits of the image signal DVa received from the A/D converter 124 and changes it to an image signal DVg that has a dynamic range wider than that of the image signal DVd output from the signal-processing unit 130 and less amount of data than that of the image signal DVa. The bit change portion 151 supplies the processing-information-adding portion 152 with the image signal DVg. The processing-information-adding portion 152 adds the processing information FP to the image signal DVg to produce the signal DWa and supplies he second output unit 160 with the signal DWa.

The second output unit 160 receives the signal DWa from the signal-producing unit 150 and converts the signal DWa to a signal having a transmission format corresponding to an apparatus for the post-production processing to produce a second output signal DWout.

The control unit 170 in connected to the user interface unit 180. The user interface unit 180 supplies the control unit 170 with an operation signal PS such as a signal based on user's operation and a signal received from any outer control device, not shown. The control unit 170 produces a control signal CT based on the operation signal PS so that the imaging apparatus 100 can operate corresponding to the operation signal PS received from the user interface unit 180 and supplies various units with the control signal CT.

Although the signal-processing unit 130 has supplied the signal-producing unit 150 with the processing information FP as shown in FIG. 5, the control unit 170 can supply the signal-producing unit 150 with the processing information FP if the control unit 170 sets various kinds of signal processing in the signal-processing unit 130. If any processing to be performed in the signal-processing unit 130 is fixed, the signal-producing unit 150 may store previously the processing information FP that indicates which signal processing is performed in the signal-processing unit 130.

The following will describe operations of the imaging apparatus 100. It is supposed that the first output unit 140 in the imaging apparatus 100 produces the output signal DVout using a component signal with a width in 10 bits. It is also supposed that in such the component signal with a width in 10 bits, namely, a brightness signal or a signal on the three primary colors with a width in 10 bits, a black level (0%) is set at 64 levels and a white peak level (100%) is set at 940 levels. It is further supposed that a level of zero signal in the color difference signal is set at 512 levels.

Figure 6:
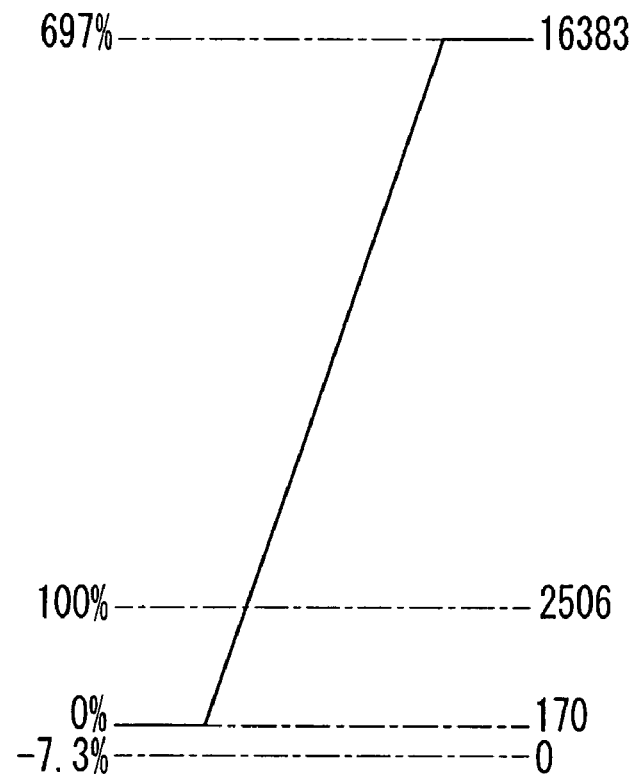
FIG. 6 is a graph for illustrating operations of an A/D converter.

If using a component signal with a width in 10 bits, the A/D converter 124 performs an A/D conversion concerning a width in 14 bits so that the digital image signal DVa corresponding to the image signal SVb can be produced even when the received image signal SVb is about 600%. Even if performing the A/D conversion concerning a width in 14 bits when its resolution equals to a width in 10 bits, it is difficult to process an image signal having signal levels corresponding to a width in 14 bits if using its dynamic range of a width in 10 bits effectively. For example, an image signal corresponding to a width in 14 bits has signal levels of 0 through 16383 but if its resolution equals to a width in 10 bits, its 600% is set at 5320 levels when the black level is set at 64 levels so that its dynamic range is not used effectively. Thus, if performing the A/D conversion concerning a width in 14 bits, the A/D converter 124 can use its dynamic range effectively by enhancing its resolution to a high level. For example, by enhancing its resolution, the black level (0%) is set at 170 levels and the white peak level (100%) is set at 2506 levels, as shown in FIG. 6. In this case, the maximum level of the image signal corresponding to a width in 14 bits is set at 16383 levels, which correspond to 697%. This enables signal levels of the image signal to be represented using such the dynamic range effectively. Thus, the A/D converter 124 converts the received image signal SVb to the image signal DVa with a width in 14 bits.

The color-control-processing portion 131 of the signal-processing unit 130 performs any processing such as white balance setting, linear matrix processing, hue adjustment and the like. In the white balance setting, a gain on the image signal can be adjusted so that a white subject can be represented white at adequate color temperature. In the linear matrix processing, a matrix operation between the image signal and masking coefficient is carried out to perform color control processing so that its color reproductivity can be enhanced. In the hue adjustment, hue discrimination is performed and by using a result of the hue discrimination, a gain on the image signal can be adjusted so that a level of the specified hue region can become a desired level.

Figure 7:
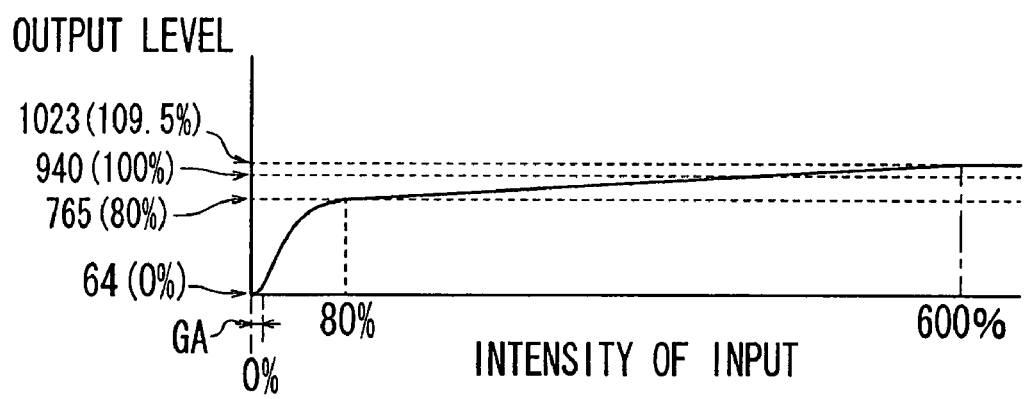
FIG. 7 is a graph for illustrating operations of a nonlinear-processing portion.

A nonlinear-processing portion 132 performs a dynamic range compression processing and a gamma compensation using the image signal DVb received from the color-control-processing portion 131. FIG. 7 illustrates operations of the nonlinear-processing portion 132 and a relationship between intensity of input and output level of the image signal DVc output from the nonlinear-processing portion 132.

The nonlinear-processing portion 132 performs Knee compensation as the dynamic range compression processing and compresses a level of the signal when intensity of input is reached at a point that is a Knee point level or more. The nonlinear-processing portion 132 also performs white clip processing by which when a level of the signal when intensity of input is reached at a point that is a white clip point (about 109%) or more, the level of the signal is limited to the white clip point. The nonlinear-processing portion 132 performs the dynamic range compression processing on the image signal to narrow its width in bits, for example, to a width in 10 bits, and produce the signal with width in 10 bits.

FIG. 7 shows the Knee compensation in which if setting the Knee point at 80%, the white clip point can be set at 600% of the intensity of input. In this case, if the intensity of input is 80%, the output level of the image signal Dvc indicates 765 levels and if the intensity of input is 600% or more, the output level of the image signal DVc indicates 1023 levels. It is to be noted that if Knee slope is steep (if an amount of compensation is small), the white clip point appears a point of the intensity of input that is less than 600%.

The nonlinear-processing portion 132 performs gamma compensation corresponding to input-output characteristics of display device used in the image-display device. The nonlinear-processing portion 132 may perform black gamma compensation so that tone of a low brightness portion is compensated. In FIG. 7, the black gamma compensation such that hue in a dark image portion, for example, a region GA of the intensity of input from 0% to 20%, can be richly represented is shown.

When the nonlinear-processing portion 132 performs nonlinear processing such as the Knee compensation or the gamma compensation, it uses a broken line approximation or a compensation table, for example. If using the broken line approximation, when a broken line point or an inclination of the broken line alters, characteristics of the Knee compensation or the gamma compensation can alter. If using the compensation table, when various kinds of compensation tables such as the Knee point, the Knee slope, the gamma curve, upper-limit level of the black gamma and the like are previously prepared, nonlinear processing such that any one of the compensation table is selected and used is carried out.

A detail-processing portion 133 is constituted of a line memory and a filter. The detail-processing portion 133 extracts horizontal and vertical contour potions from the image signal DVc and performs contour compensation by adding signal components of the extracted contour potions to the image signal. In this contour compensation, frequency components of the contour potions to be extracted can be adjusted by changing characteristics of the filter. A level of intensity of the contour can be also adjusted by adjusting and adding the signal levels of the extracted contour potions.

The first output unit 140 performs any output processing on the image signal DVd on which the contour compensation has been performed. For example, if the imaging apparatus 100 outputs a brightness signal and a color difference signal to image-displaying device and/or image-recording device, the first output unit 140 performs matrix operation on the image signal DVd to produce the brightness signal and the color difference signal. The first output unit 140 converts the produced brightness and color difference signals to signals corresponding to a transmission format and outputs them. For example, the first output unit 140 outputs them as output signals DVout having a format of high definition serial data interface (HD-SDI) 10 bit single link 4:2:2.

Figure 8:
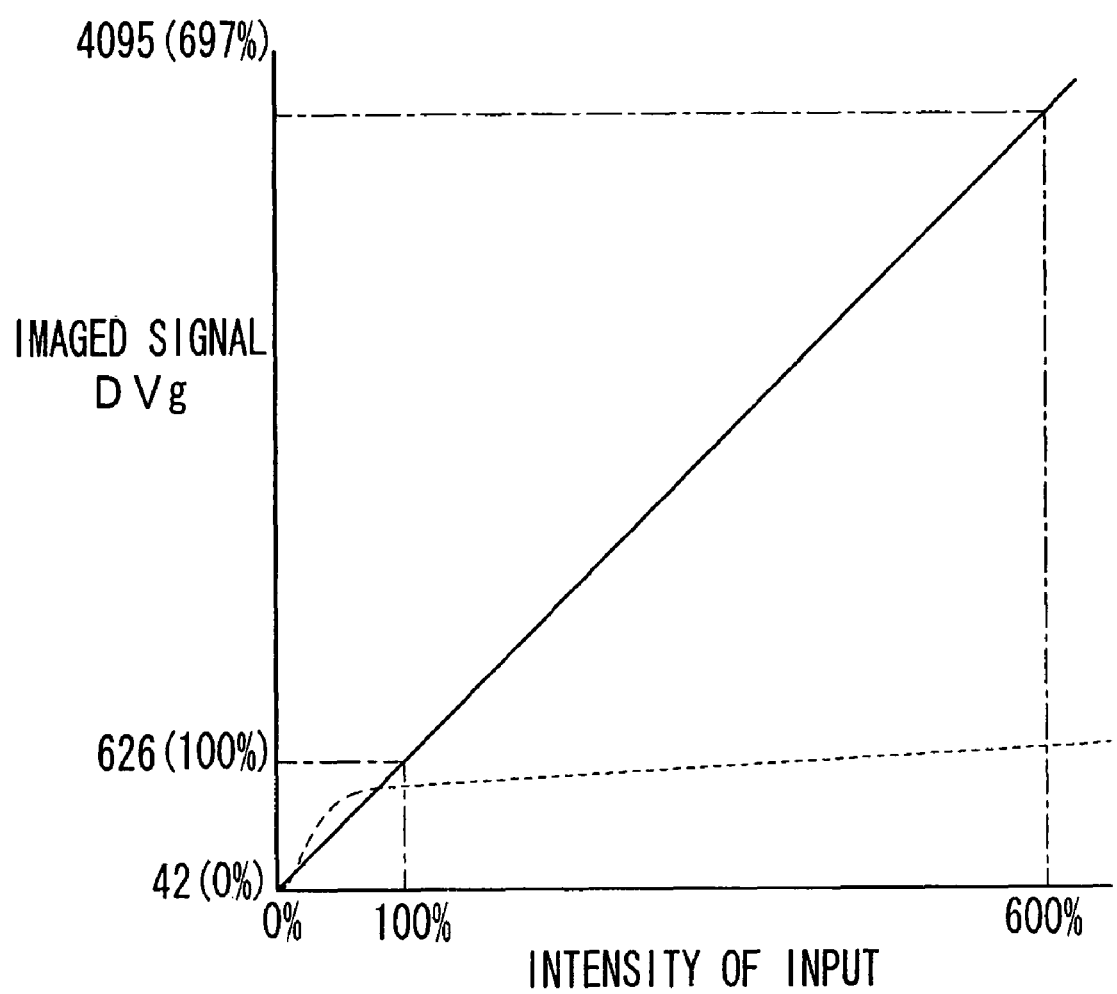
FIG. 8 is a graph for illustrating operations of a bit change portion.

The bit change portion 151 in the signal-producing unit 150 receives the image signal DVa from the A/D converter 124 and decreases an amount of data on the image signal DVa. The bit change portion 151 changes bits in the image signal DVa so that its dynamic range wider than that of the output signal DVout to be supplied to the image-display device or the image-recording device can be kept. FIG. 8 illustrates operations of the bit change portion 151. For example, the bit change portion 151 deletes lower-most two bits from the image signal DVa to produce an image signal DVg with a width in 12 bits. The bit change portion 151 supplies the processing-information-adding portion 152 with the image signal DVg. In FIG. 8, a dynamic range of the output signal DVout output from the first output unit 140 is shown by dotted lines for comparison. The bit change portion 151 may change bits in the image signal DVa to a signal with a width in 12 bits in which a resolution of image signal with a width in 10 bits is halved so that its post-production processing can be easily realized. In this moment, in the image signal DVg, the intensity of input of 0% corresponds to 32 levels and the intensity of input of 928% corresponds to 4098 levels that are maximum level of the signal with a width in 12 bits.

The signal-producing unit 150 may performs bit change so that the intensities of input from 0% to 600% can correspond to signal levels from 0 to 4098 levels. In this moment, its color tone reproductivity becomes about 0.15%/bit, thereby enabling to be obtained the same color tone reproductivity as that of a signal with a width in 10 bits in which, for example, the black level of 0% is set at 64 levels and the white peak level is set at 940 levels. Its color tone reproductivity is improved 26 times as much as a compressed portion of the image signal in a case where the Knee compensation is performed on the image signal so that the intensity of input from 80% to 600% can be compressed to the intensity of input from 80% to 100%.

The processing-information-adding portion 152 adds the processing information FP that indicates which signal processing is performed in the color-control-processing portion 131, the nonlinear-processing portion 132, and the detail-processing portion 133, to the image signal DVg received from the bit change portion 401 to produce the signal DWa. The processing-information-adding portion 152 supplies the second output unit 160 with the signal DWa. For example, if the white balance adjustment, the hue adjustment, the linear matrix processing and the like are performed in the color-control-processing portion 131, information concerning how gain is adjusted in the white balance adjustment, how masking coefficient is used in an operation of the linear matrix processing, how gain is adjusted in the hue adjustment, and the like is added thereto as the processing information FP. If the Knee compensation or the gamma compensation is performed in the nonlinear-processing portion 132, information concerning which Knee point or Knee slope is used in the Knee compensation, which compensation table is used in the Knee compensation, which broken line approximation or compensation table is used in the gamma compensation, and the like is added thereto as the processing information FP. If the contour compensation is performed in the detail-processing portion 133, information concerning filter setting condition, gain when adding a signal indicating contour components, and the like is added thereto as the processing information FP. Such the processing information FP is inserted within a blank period of time in an image signal, for example, a blanking interval. The processing information FP can be inserted into a region of the image signal into which a digital audio signal, auxiliary data, and the like are inserted.

The second output unit 160 receives the signal DWa from the signal-producing unit 150 and converts it to the output signal DWout with a transmission format corresponding to a post-production processing apparatus to output it. For example, if using the HD-SDI, four links is used because the image signal DVg has a width in 12 bits. The second output unit 160 can communicate utilizing any communication standards for communication in a network at a transmission rate of 10 G bits/second or more, Internet small computer system interface (iSCSI) for communication of SCSI commands used for communication between storage device and a computer via a network, a fiber channel that is standardized as one of the data transmission systems for connecting a computer with peripheral equipment, and the like.

Thus, the imaging apparatus 100 outputs the output signal DVout to which the dynamic range compression processing has been performed as well as it outputs the output signal DWout wherein the processing information FP is added to an image signal to which no dynamic range compression processing has been performed. When using the output signal DWout, the imaging apparatus 100 can provide an image having an excellent picture quality even if any post-production processing that is identical to that of a case where film camera is used is performed. For example, if an editor demands increase in exposure compensation and an alteration of gamma curve, the imaging apparatus 100 can provide an image having less reduced picture quality. Because any nonlinear processing does not exert on the output signal DWout, it is possible to decrease times of nonlinear processing as compared by a case where processing is performed using the output signal DVout, thereby enabling an image having an excellent picture quality to be provided. Since an image having a wider dynamic range is provided when the output signal DWout is used, any color tone remains even if an image contains a subject (sun, light or the like) having a high brightness, thereby enabling a natural image representation to be realized.

The imaging apparatus 100 also outputs the output signal DVout to which the dynamic range compression processing is performed so that if using the output signal DVout, it is possible to check an image for shooting easily. If the output signal DVout is recorded, it is possible to decide how an image is configured easily before the post-production processing.

The post-production-processing apparatus may perform any processing on a portion of an image where the post-production processing is not required using the output signal DVout as it is, thereby enabling edition processing to be efficiently performed.

The output signal DWout includes the processing information FP so that if using the processing information FP, it is possible to provide an image that a user desires at shooting, namely, an image with color reproductivity or gamma property at shooting when any signal processing is performed based on the processing information FP even if the post-production processing is performed using the output signal DWout.

Although, in the above first embodiment, the bit change portion 151 of the signal-producing unit 150 has decreased an amount of data by deleting lower-most two bits from the image signal DVa received from the A/D converter 124 to produce an image signal DVg with a width in 12 bits, an image having a higher intensity of input is evenly treated as an image having a lower intensity of input is done. The image having a higher intensity of input, however, can be treated as less weighty than the image having a lower intensity of input. The image having a lower intensity of input can be treated as less weighty than the image having a higher intensity of input.

For example, if a person, a building or the like is shot as a desired subject when shooting on location, a portion of the image where the person, the building or the like is shot has more weight than a portion of the image where the clear sky or the like is shot as a background that has a higher intensity of input. Such the portion of the image where the clear sky or the like is shot is not susceptible even if it is less weighted.

The following describe an imaging apparatus 200 according to a second embodiment of the invention in which a lager amount of data is decreased in a less weighty portion of the image by weighting.

Figure 9:
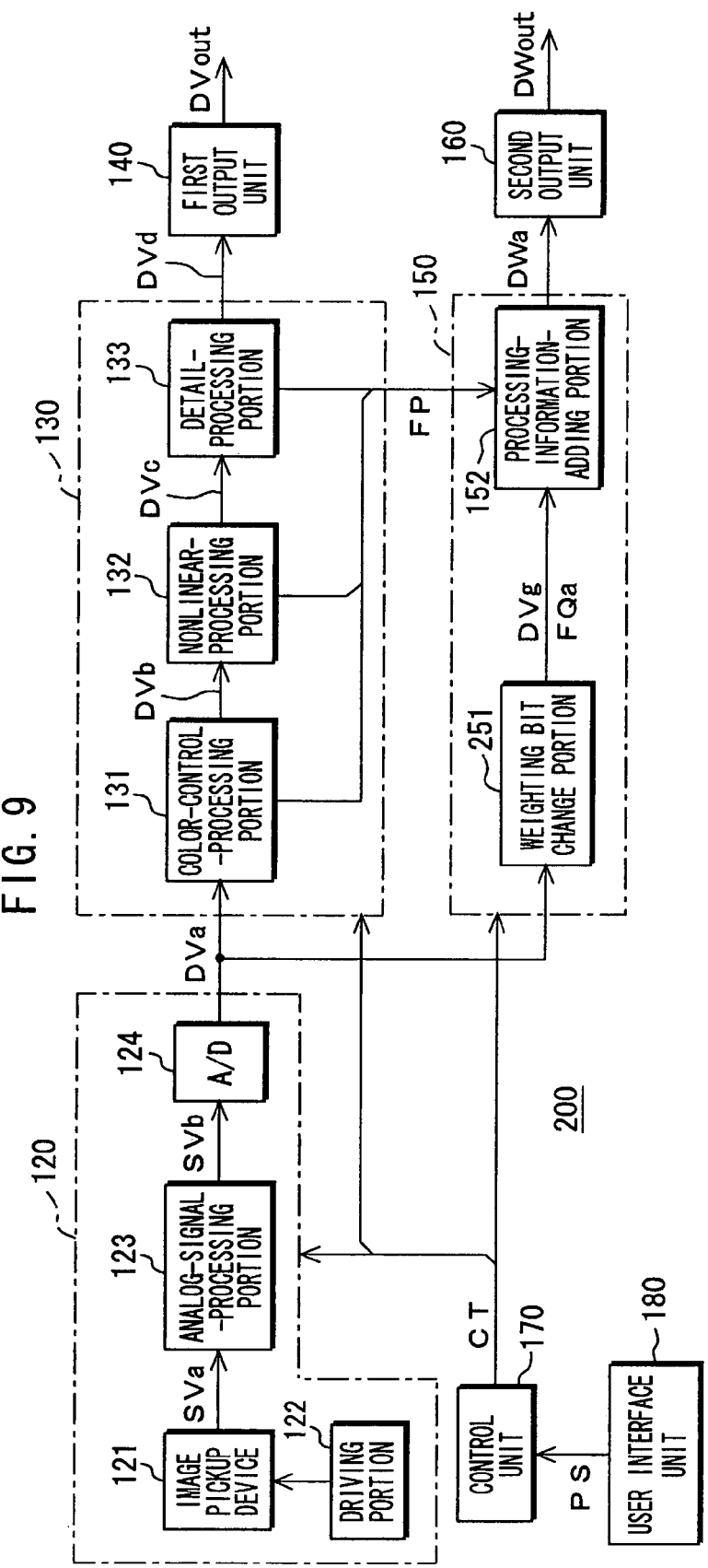
FIG. 9 is a functional block diagram for illustrating a configuration of an imaging apparatus according to a second embodiment of the invention.

FIG. 9 illustrates a configuration of the imaging apparatus 200. In the imaging apparatus 200 shown in FIG. 9, like reference numbers refer to like elements of the imaging apparatus 100 shown in FIG. 5, detailed description of which will be deleted.

Figure 10:
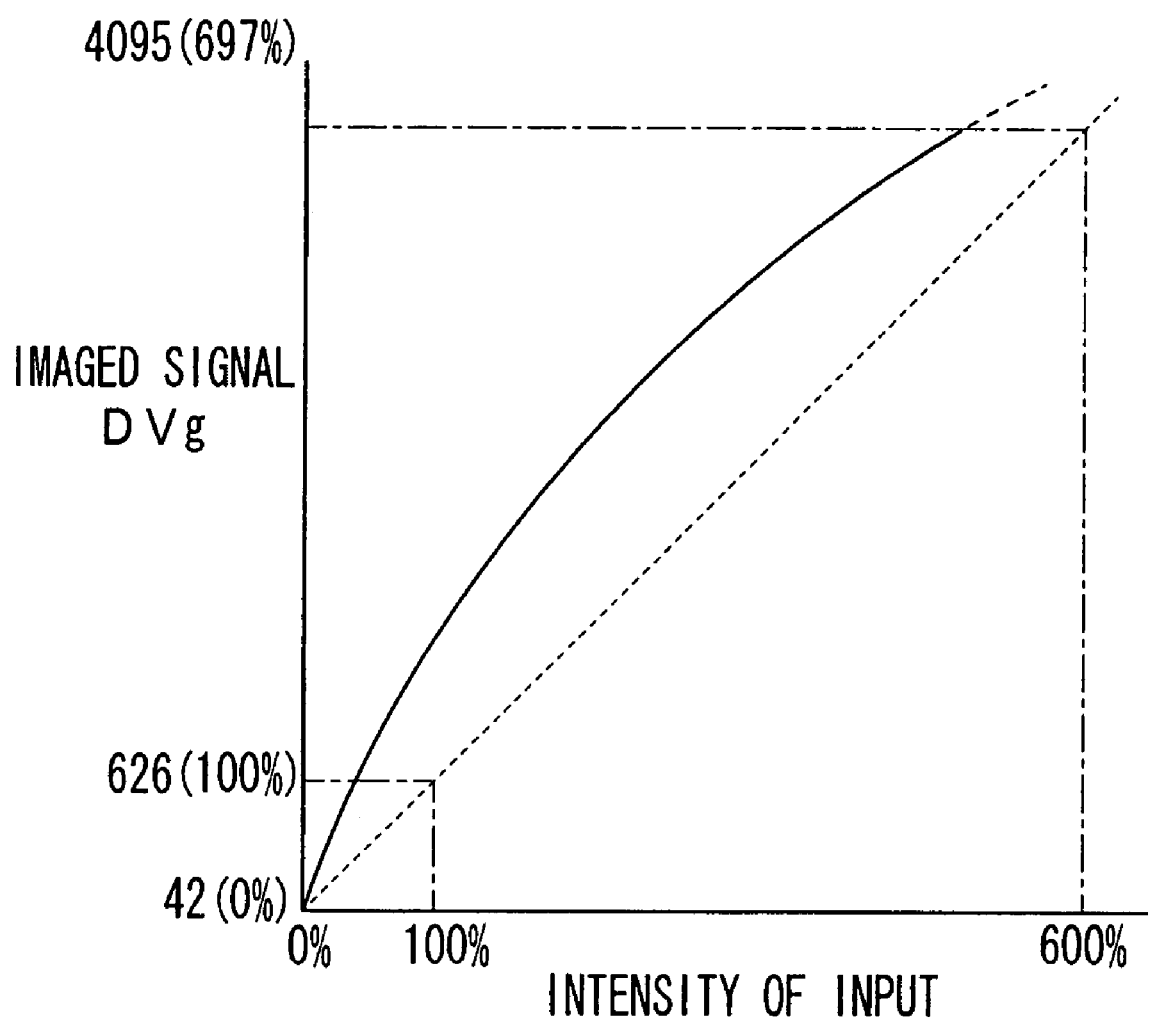
FIG. 10 is a graph for illustrating operations of a weighting bit change portion.

A weighting bit change portion 251 of the signal-producing unit 150 decreases an amount of data of the image signal DVa by weighting when the weighting bit change portion 251 decreases an amount of data by changing the image signal DVa received from the A/D converter 124 with a width in 14 bits to the image signal DVg with a width in 12 bits. FIG. 10 illustrates operations of the weighting bit change portion 251. As shown in FIG. 10, the weighting bit change portion 251 weights the image signal DVa using, for example, logarithm function, irrational function or the like so that when the intensity of input is high, its resolution can be widely lowered as compared with a case where its resolution when intensity of input is low is done. If the intensity of input is divided into some regions, the resolution may be shifted for each region. For example, in a region of the intensity of input below 400%, fine resolution is available while in a region of the intensity of input of 400% or more, coarse resolution is available. In such a case, it is possible to lower color tone reproductivity of a high brightness portion of the image and raise color tone reproductivity of a more frequently use portion of the image. If the weighting is performed so that the resolution of the important region is raised, it is possible to improve color tone reproductivity of the important region.

The weighting bit change portion 251 supplies the processing-information-adding portion 152 with weighting information FQa that indicates which weighting is performed in the weighting bit change portion 251. The processing-information-adding portion 152 receives the weighting information FQa and adds the weighting information FQa as the processing information to the image signal DVg. If the control unit 170 controls the weighting by the weighting bit change portion 251, the control unit 170 can supply the processing-information-adding portion 152 with the weighting information FQa.

Such the weighting restrains picture quality of the important portion of the intensity of input from being reduced because finer resolution is set on the portion even if an amount of data of this portion is decreased by narrowing a width in bits thereof. Adding the weighting information allows to be properly determined how intensity of input the signal level of the output signal DWout corresponds to if the post-production processing is performed using the output signal DWout.

The following describe an imaging apparatus 300 according to a third embodiment of the invention in which when the signal-producing unit 150 decreases an amount of data of the image signal DVa received from the A/D converter 124, the signal-producing unit 150 produces the signal DWa so that the output signal DVout output from the first output unit 140 can supplement any lacked information, thereby decreasing a larger amount of data.

Figure 11:
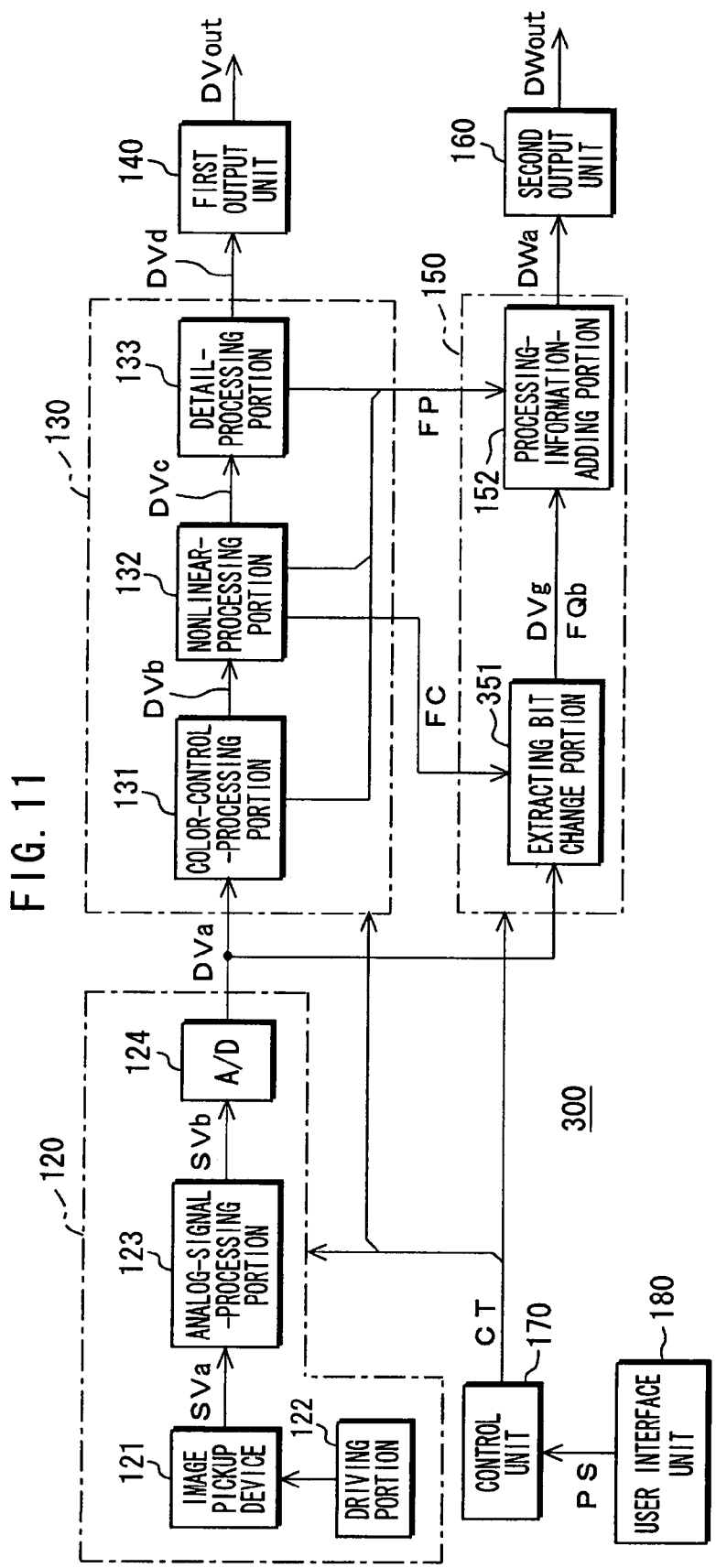
FIG. 11 is a functional block diagram for illustrating a configuration of an imaging apparatus according to a third embodiment of the invention.

FIG. 11 illustrates a configuration of the imaging apparatus 300. In the imaging apparatus 300 shown in FIG. 11, like reference numbers refer to like elements of the imaging apparatus 100 shown in FIG. 5, detailed description of which will be deleted.

If the Knee compensation is performed in the nonlinear-processing portion 132 when the intensity of input is higher than a Knee point, the level of output signal is compressed to decrease its amount of data. The nonlinear-processing portion 132 thus supplies an extracting bit change portion 351 of the signal-producing unit 150 with nonlinear processing information FC that indicates the Knee point, an upper limit level of black gamma, which is gamma compensation on a dark portion of an image. The extracting bit change portion 351 extracts information on a region where the intensity of input is higher than the Knee point based on the nonlinear processing information FC and changes the extracted information with width in 14 bits to that with width in 12 bits to decrease an amount of data thereof.

Figure 12:
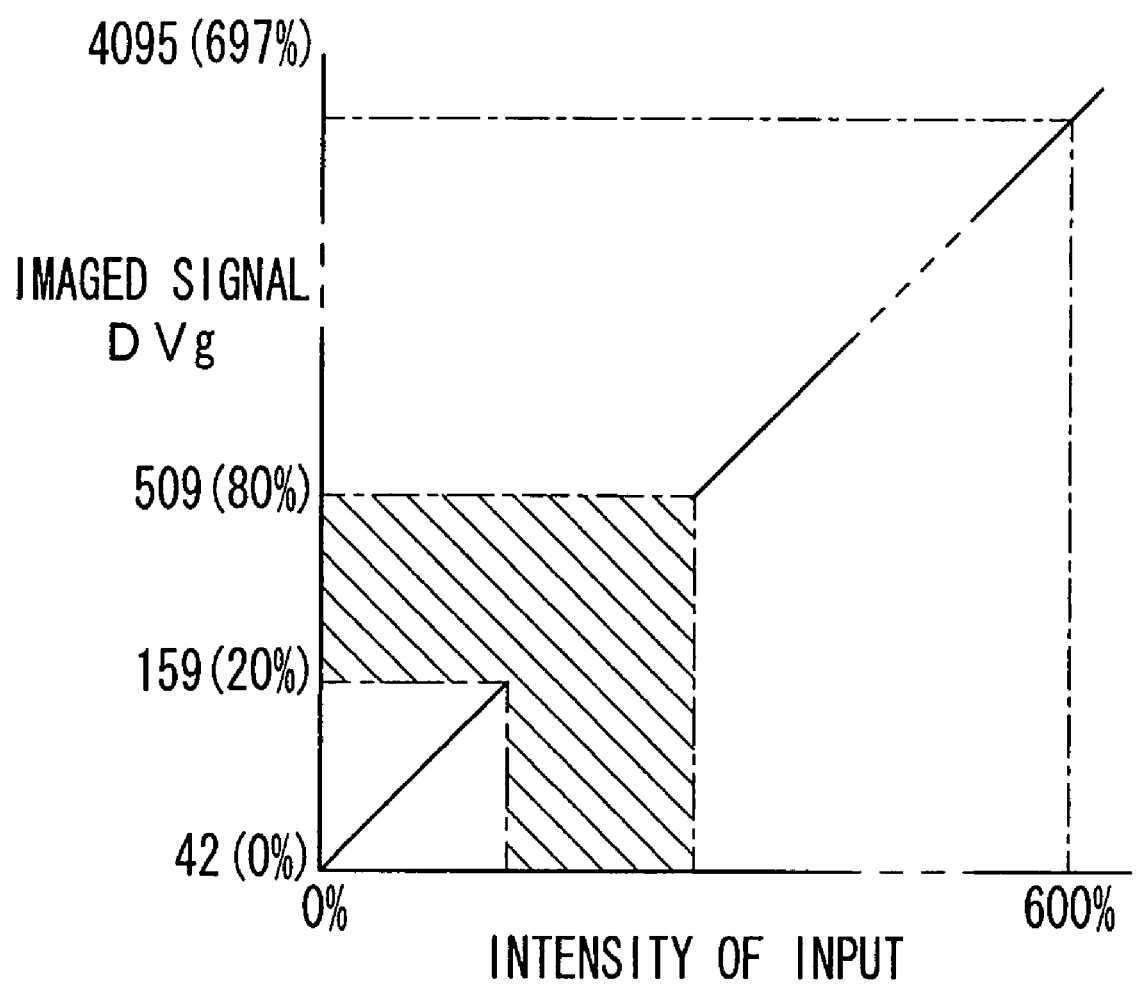
FIG. 12 is a graph for illustrating operations of an extracting bit change portion.

If the black gamma compensation is performed in the nonlinear-processing portion 132, the extracting bit change portion 351 extracts information on a region where the intensity of input reaches the upper limit level of the black gamma based on the nonlinear processing information FC and changes the extracted information with width in 14 bits to that with width in 12 bits to decrease an amount of data thereof. FIG. 12 illustrates operations of the extracting bit change portion 351. For example, if the Knee point is set at 80% of the intensity of input and the upper limit level of the black gamma is set at 20% thereof, a signal having the intensity of 20% or less with width in 14 bits and a signal having the intensity of 80% or more with width in 14 bits are converted to those with width in 12 bits, except for information on a region from 20% to 80% as shown in FIG. 12 in which an excellent color tone reproductivity is obtained, thereby decreasing an amount of data thereof.

The extracting bit change portion 351 supplies the processing-information-adding portion 152 with extracting control information FQb that indicates how information is extracted in the extracting bit change portion 351. The processing-information-adding portion 152 receives the extracting control information FQb and adds the extracting control information FQb as the processing information to the image signal DVg. If the control unit 170 controls the extract condition in the extracting bit change portion 351, the control unit 170 can supply the processing-information-adding portion 152 with the extracting control information FQb.

Thus, extracting only a signal of level region in which the Knee compensation or the black gamma compensation is performed enables an amount of data of the output signal DWa output from the signal-producing unit 150 to be further decreased. Specially, if a portion of the intensity of input in which the Knee compensation or the black gamma compensation is not performed contains mainly in the shot image, a large amount of data can be decreased.

The following describe an imaging apparatus 400 according to a fourth embodiment of the invention in which a combination of processing in performed in the imaging apparatus 200 and processing in performed in the imaging apparatus 300 is performed.

Figure 13:
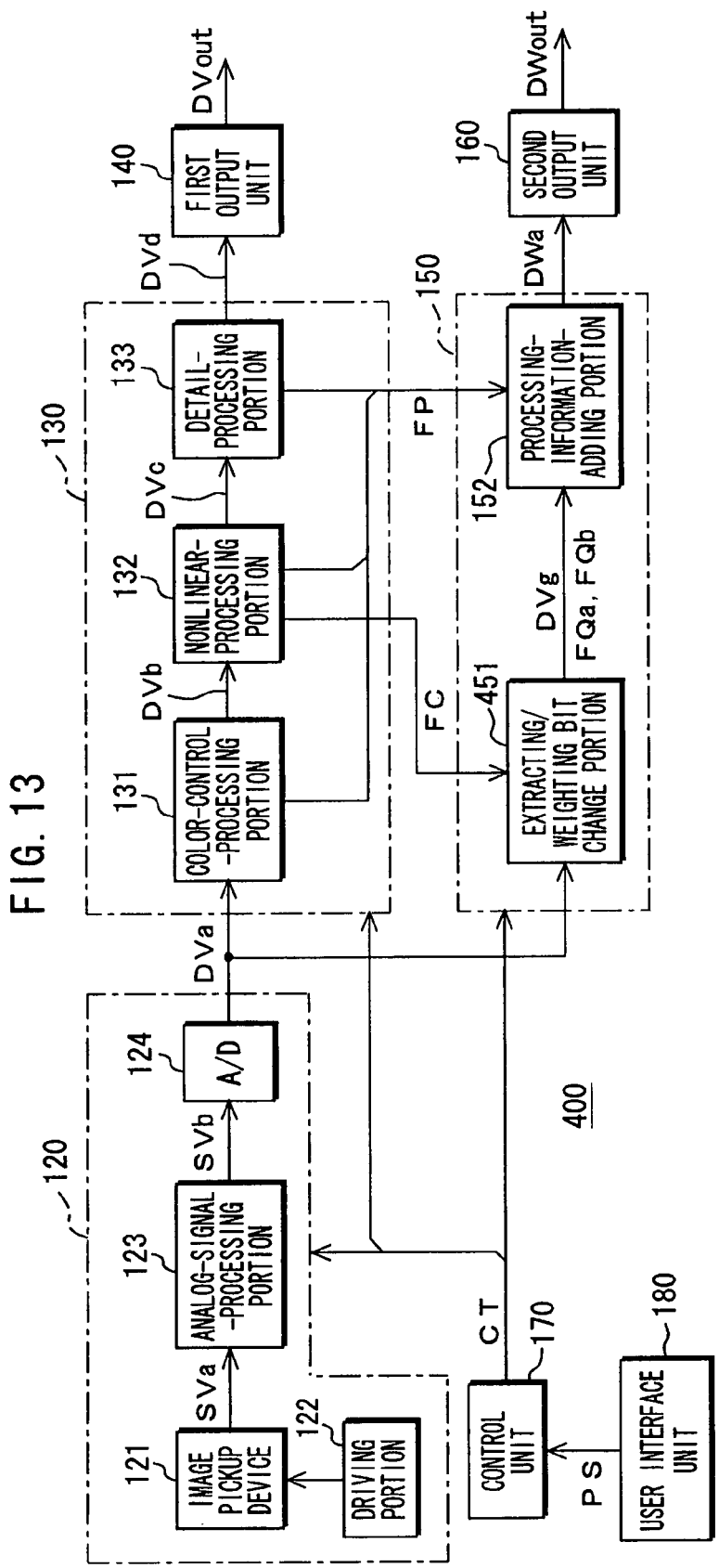
FIG. 13 is a functional block diagram for illustrating a configuration of an imaging apparatus according to a fourth embodiment of the invention.

FIG. 13 illustrates a configuration of the imaging apparatus 400. In the imaging apparatus 400 shown in FIG. 13, like reference numbers refer to like elements of the imaging apparatus 100 shown in FIG. 5, detailed description of which will be deleted.

Figure 14:
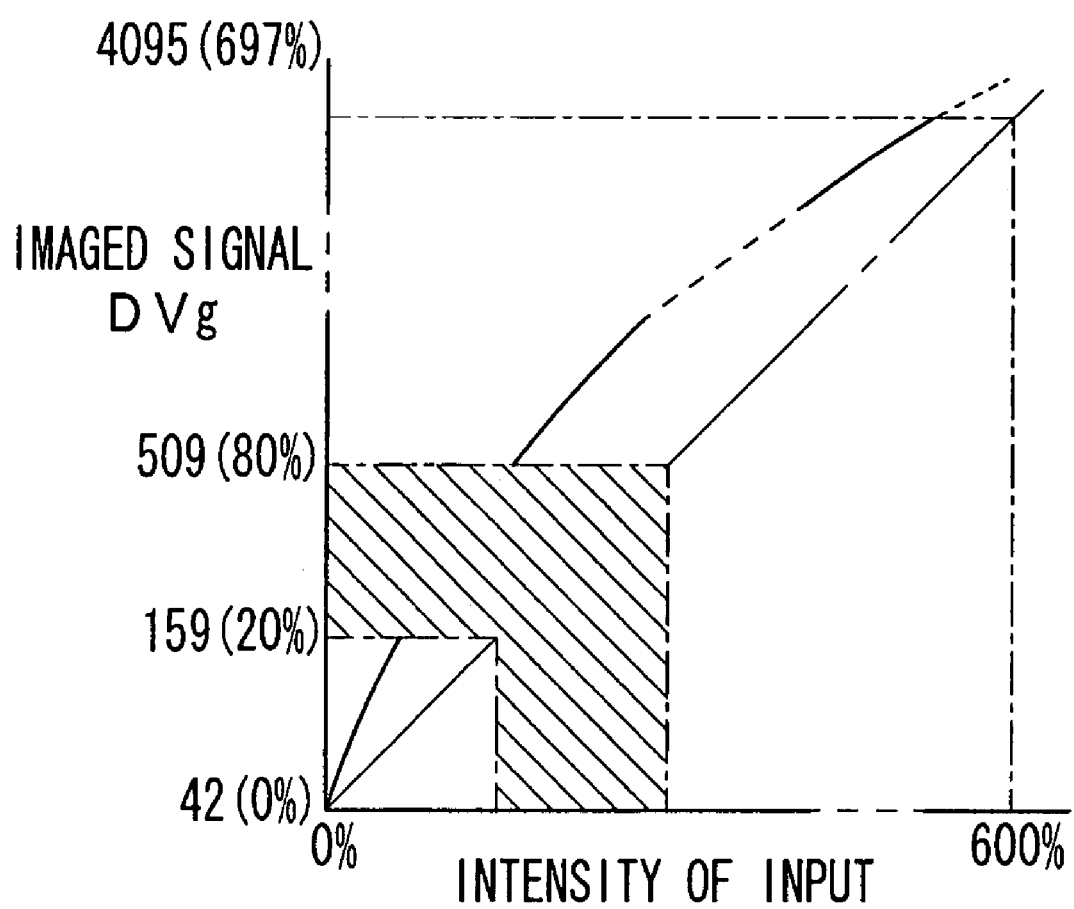
FIG. 14 is a graph for illustrating operations of an extracting and weighting bit change portion.

An extracting and weighting bit change portion 451 performs extraction processing based on the nonlinear processing information FC like the extracting bit change portion 351 and weights the extracted signal like the weighting bit change portion 251 to change a signal with width in 14 bits to a signal with width in 12 bits, thereby decreasing an amount of data thereof. FIG. 14 illustrates operations of the extracting and weighting bit change portion 451. For example, if the Knee point is set at 80% of the intensity of input and the upper limit level of the black gamma is set at 20% thereof, information on the intensity of input of 20% or less and information on the intensity of 80% or more are extracted and the extracted signal with width in 14 bits is converted to that with width in 12 bits as shown in FIG. 14 so that the resolution of information on the intensity of input of 20% or less can be fined and the resolution of information on the intensity of input of 80% or more can become coarse gradually, thereby decreasing an amount of data thereof. It is to be noted that the weighting information FQa and the extracting control information FQb are supplied to the processing-information-adding portion 152 in which they are added to the image signal DVg as the processing information FP.

Thus, information lacked in the output signal DVout can be supplemented so that fine resolution is available for a more important region and coarse resolution is available for a less important region.

The following describe an imaging apparatus 500 according to a fifth embodiment of the invention in which the image signal DVg output from the bit change portion 151, the weighting bit change portion 251, the extracting bit change portion 351, or the extracting and weighting bit change portion 451 is compressed so that an amount of data thereof can be further decreased.

Figure 15:
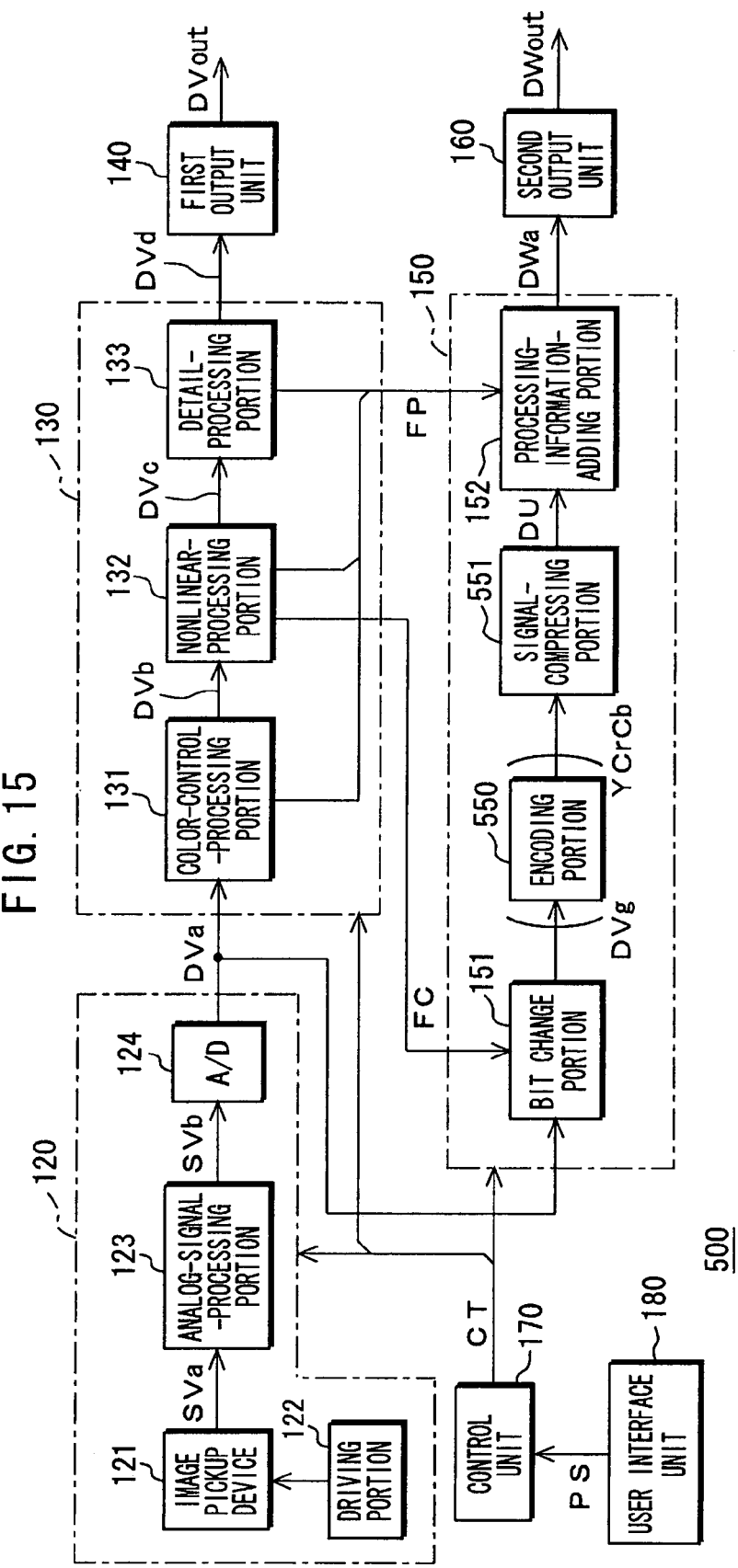
FIG. 15 is a functional block diagram for illustrating a configuration of an imaging apparatus according to a fifth embodiment of the invention.

FIG. 15 illustrates a configuration of the imaging apparatus 500. In the imaging apparatus 500 shown in FIG. 15, like reference numbers refer to like elements of the imaging apparatus 100 shown in FIG. 5, detailed description of which will be deleted.

The bit change portion 151 outputs the image signal DVg to a signal-compressing portion 551. It is to be noted that the weighting bit change portion 251, the extracting bit change portion 351, or the extracting and weighting bit change portion 451 instead of the bit change portion 151 can output the image signal DVg.

If the signal-producing unit 150 outputs a compressed signal constituted of the brightness signal and the color difference signal, the bit change portion 151 (weighting bit change portion 251, the extracting bit change portion 351, or the extracting and weighting bit change portion 451) supplies an encoding portion 550 with the image signal DVg. The encoding portion 550 performs matrix operation using the image signal DVg to produce a brightness signal Y, color difference signals Cr, Cb. The encoding portion 550 supplies the signal-compressing portion 551 with the produced signals.

The signal-compressing portion 551 compresses the image signal DVg received from the bit change portion 151 (weighting bit change portion 251, the extracting bit change portion 351, or the extracting and weighting bit change portion 451) or the brightness signal Y and the color difference signals Cr, Cb produced in the encoding portion 550. As such the compression processing, processing such that its redundancy can be deleted by utilizing a spatial correlation (for example, block encoding), processing such that its redundancy can be deleted by utilizing a temporal correlation (for example, motion-compensating inter-frame coding), and processing such that an amount of data can be decreased by utilizing an appearance of code (for example, Huffman coding or entropy coding) are used. The signal-compressing portion 551 supplies the processing-information-adding portion 152 with the coded signal DU thus compressed.

The processing-information-adding portion 152 adds the above processing information FP to the coded signal DU received from the signal-compressing portion 551 to produce the signal DWa. The processing-information-adding portion 152 supplies the second output unit 160 with the signal DWa. The second output unit 160 receives the signal DWa from the processing-information-adding portion 152 and converts it to the output signal DWout with a transmission format corresponding to any post-production processing apparatus to output it.

The compression processing in the signal-compressing portion 551 enables an amount of data of the output signal DWout to be further decreased. If the imaging apparatus 500 is connected to the post-production processing apparatus under a situation that communication is performed at a lower transmission rate than that when no compression processing is performed, it is possible to supply the post-production processing apparatus with the shot image at real time according to this embodiment, thereby allowing the imaging apparatus 500 and the post-production processing apparatus to be connected at low price.

Although the signal-processing unit 130, the signal-producing unit 150, the first and second output units 140, 160 and the like have been configured by hardware in the above first and fifth embodiments, this invention is not limited thereto. They can be configured by software. If a signal-processing step of performing dynamic range compression processing on the image signal DVa obtained by imaging a subject, a first output step of producing a first output signal based on the image signal processed in the signal-processing step, a signal-producing step of producing a signal including the image signal and processing information that indicates which dynamic range compression processing is performed in the signal-processing step, and a second output step of producing a second output signal based on the signal produced in the signal-producing step are carried out in a computer, it is possible to obtain an excellent effect same as that obtained by the hardware configuration.

It should be understood by those skilled in the art that various modifications, combinations, sub-combinations and alternations may occur depending on design requirements and other factors insofar as they are within the scope of the appended claims or the equivalents thereof.

What is claimed is:

1. An imaging apparatus comprising:
    an imaging unit that images a subject and produces an image signal;
    a signal-processing unit that performs a plurality of signal processing on the image signal;
    a first output unit that produces a first output signal based on the image signal processed in the signal-processing unit;
    a signal-producing unit that produces a signal by inserting processing information about each of the plurality of signal processing performed in the signal-processing unit into an image signal having a dynamic range wider than that of the image signal output from the signal-processing unit, and less amount of data than that of the image signal,
        wherein the plurality of signal processing includes at least one of a plurality of color tuning processing, one of a plurality of non-linear processing and detail processing; and a second output unit that produces a second output signal based on the signal produced in the signal-producing unit.

2. The imaging apparatus according to claim 1,
wherein the signal-processing unit performs dynamic range compression processing as one of the plurality of non-linear processing; and
wherein the signal-producing unit adds, to the image signal, the processing information that indicates dynamic range compression processing is performed in the signal-processing unit.

3. The imaging apparatus according to claim 1
wherein the signal-processing unit performs Knee compensation as the dynamic range compression processing; and
wherein the signal-producing unit extracts an image signal including a signal of a region on which the Knee compensation is performed and adds the processing information to the extracted image signal.

4. The imaging apparatus according to claim 1
wherein the signal-processing unit performs gamma compensation on a dark portion of the image; and
wherein the signal-producing unit extracts an image signal including a signal of a region in which the gamma compensation is performed on the dark portion thereof and adds the processing information indicating which processing is performed in the gamma compensation to the extracted image signal.

5. The imaging apparatus according to claim 1 wherein the signal-producing unit reduces an amount of its data by degrading resolution of the image signal.

6. The imaging apparatus according to claim 5 wherein the signal-producing unit weights the image signal and adjusts the resolution based on the weighting.

7. The imaging apparatus according to claim 1 wherein the signal-producing unit performs compression processing on the image signal and adds the processing information to the compressed image signal.

8. A method of processing an image signal comprising:
an imaging step of imaging a subject and producing an image signal;
a signal-processing step of performing a plurality of signal processing on the image signal;
a first output step of producing a first output signal based on the image signal processed in the signal-processing step;
a signal-producing step of producing a signal by inserting processing information about each of the plurality of signal processing performed in the signal-processing step into an image signal having a dynamic range wider than that of the image signal output from the signal-processing unit, and less amount of data than that of the image signal,
wherein the plurality of signal processing includes at least one of a plurality of color tuning processing, one of a plurality of non-linear processing and detail processing; and
a second output step of producing a second output signal based on the signal produced in the signal-producing step.

9. A program product of processing an image signal, said program product that allows a computer to perform a method of processing an image signal, said method comprising:
a signal-processing step of performing a plurality of signal processing on the image signal produced by imaging a subject;
a first output step of producing a first output signal based on the image signal processed in the signal-processing step;
a signal-producing step of producing a signal by inserting processing information about each of the plurality of signal processing performed in the signal-processing step into an image signal having a dynamic range wider than that of the image signal output from the signal-processing unit, and less amount of data than that of the image signal,
wherein the plurality of signal processing includes at least one of a plurality of color tuning processing, one of a plurality of non-linear processing and detail processing; and
a second output step of producing a second output signal based on the signal produced in the signal-producing step.

* * * * *